United States Patent [19] [11] Patent Number: 4,676,475
Grandin et al. [45] Date of Patent: Jun. 30, 1987

[54] MOULDING DEVICE FOR THE MANUFACTURE OF SEMI-HARD PRESSED CHEESE

[75] Inventors: Claude Grandin, Precorbin; Daniel Champagneux; Phillippe D. d'Aprigny, both of Saint Lo, all of France

[73] Assignee: Union Laitiere Normande, France

[21] Appl. No.: 706,601

[22] Filed: Feb. 28, 1985

[30] Foreign Application Priority Data

Mar. 2, 1984 [FR] France ............................ 84 03314

[51] Int. Cl.$^4$ ............................................ A01J 25/13
[52] U.S. Cl. ............................ 249/105; 249/121; 249/129; 249/141; 249/160
[58] Field of Search ............... 249/119, 120, 129, 141, 249/160, 105, 55, 108, 121; 425/84

[56] References Cited

U.S. PATENT DOCUMENTS

| 541,205 | 6/1895 | Henderson | 249/119 |
|---|---|---|---|
| 1,029,483 | 6/1912 | Woodworth | 249/119 |
| 1,168,819 | 1/1916 | Mildt | 249/121 |
| 2,309,579 | 1/1943 | Duran | 249/119 |
| 3,113,672 | 12/1963 | Brown | 249/119 |
| 3,161,159 | 12/1964 | Batista et al. | 249/141 |
| 3,971,118 | 7/1976 | Holmqvist | 249/160 |
| 4,417,716 | 11/1983 | Penna et al. | 249/129 |
| 4,452,419 | 6/1984 | Saleeba | 249/119 |
| 4,552,329 | 11/1985 | Hattori et al. | 425/84 |
| 4,568,554 | 2/1986 | Derode | 425/84 |

FOREIGN PATENT DOCUMENTS

| 1147640 | 11/1957 | France | 249/121 |
|---|---|---|---|
| 2036786 | 12/1970 | France | 249/141 |
| 2206055 | 6/1974 | France . | |
| 2389331 | 12/1978 | France . | |
| 95446 | 12/1959 | Norway | 249/120 |
| 299528 | 6/1954 | Switzerland | 249/120 |

Primary Examiner—Bernard Nozick
Assistant Examiner—James C. Housel
Attorney, Agent, or Firm—Weingarten, Schurgin, Gagnebin & Hayes

[57] ABSTRACT

The invention relates to a moulding device for the manufacture of semi-hard pressed cheeses from a liquid pre-cheese, such a device is made in two superposable parts, adapted to be removably assembled together in water-tight manner by a spigot-like interlocking joint, at least one of these parts comprising moulding cavities. The upper part may be constituted by interchangeable individual moulds or by an assembly of moulds connected to one another, and the lower part is a plate provided with grooves for interlocking whose configuration matches that of the base of the moulds or mould assembly. The lower part may be constituted by a multi-mould plate comprising upwardly open half-cavities for moulding and grooves for interlocking and the upper part is constituted by a counter-mould plate comprising downwardly open half-cavities for moulding, complementary of the half-cavities of the multi-mould plate, and ribs for interlocking.

4 Claims, 6 Drawing Figures

MOULDING DEVICE FOR THE MANUFACTURE OF SEMI-HARD PRESSED CHEESE

The present invention relates to a moulding device for the manufacture of cheeses of the semi-hard pressed type from a liquid pre-cheese.

French Pat. No. 2 052 121 and its Certificates of Addition disclose manufacturing cheeses by coagulation of a liquid pre-cheese, i.e. a concentrate of milk obtained by repeated or continuous ultrafiltration of the ordinary milk through a semi-permeable membrane of which the average pore dimension is less than or equal to 30 m$\mu$, under a pressure of 4 to 50 Kg/cm$^2$. The residue of ultrafiltration is a milk liquid containing all the casein of the initial milk, the major part of the soluble proteins and a fraction of the so-called soluble constituents of this initial milk (such as lactose, mineral salts), at concentrations substantially equal to those contained in a drained cheese, prepared by coagulation of the ordinary milk. The degree of concentration of the liquid pre-cheeses regulated either by time or by the control of the flowrates and pressures of passage of the ordinary milk through the semi-permeable membrane must correspond to the degree of concentration of the nitrogenous matters which are found in the type of cheese which it is desired to manufacture.

For semi-hard pressed cheeses, the weight characteristics to be obtained in the liquid pre-cheese are for example as follows:
   total dry extract: 40 to 48%
   proteinaceous material: 18 to 23%
   residual lactose: 1 to 2%

To attain these values, the milk or initial milk product:
   is concentrated volumetrically, by ultrafiltration, by about 6 to 8 times,
   has water added to it, either before any use of the ultrafiltration apparatus, or after the latter has been started up, by injection into the liquid product not passing through the membrane (diafiltration).

This liquid pre-cheese may have appropriate substances, such as lactic ferment, added thereto before being coagulated by rennet or any other coagulating substance.

Up to the present time, no appropriate moulding device has been suggested in the prior art for manufacturing cheese from this novel raw material constituted by the liquid pre-cheese described hereinabove. Contrary to the conventional moulding devices which must effect moulding of a solid curd still containing milk serum whilst allowing this milk serum to be eliminated by drainage, the moulding devices for the liquid pre-cheese must maintain said liquid pre-cheese entirely in the moulds until it has completely coagulated and is removed from the mould and must avoid any leakage of liquid outside the moulds.

These moulding devices must therefore be perfectly watertight. They must also allow the cheeses obtained to be removed from the moulds without damage to their outside appearance, and the moulds must be able to be cleaned and aseticized without too many difficulties.

It has already been proposed to employ stainless steel moulds each provided in its bottom with a valve actuated by a spring. After the coagulum is obtained, removal from moulds is ensured by:
   a prior operation of electrolysis applied to the surface of the coagulum,
   turning over of the moulds,
   thrust by compressed air, via the valve, for recovering the coagulum in counter-moulds.

However, the operations of moulding and demoulding with such a device are highly complex and, in addition, the moulding device in question is specific of the format of the cheeses, and for each format of cheese, a special unit must be envisaged.

It is an object of the present invention to overcome the drawbacks mentioned hereinabove and to provide a moulding device from materials currently used in cheese-making, said device being perfectly water-tight during the moulding operation and being adapted to be dismantled into a plurality of parts in order to facilitate demoulding and cleaning.

The present invention therefore relates to a moulding device for the manufacture of cheeses from a liquid pre-cheese, made in two superposable parts, adapted to be removably assembled together in water-tight manner by a spigot-like interlocking joint, at least one of these parts comprising moulding cavities.

The spigot-like interlocking joint comprises at least one rib provided on one of the parts and fitting in or forced in at least one groove provided on the other part and matching said rib. For example, said rib and said groove have annular cross-section.

According to a first embodiment of the moulding device according to the invention, the upper part is constituted by a certain number of interchangeable individual moulds, each comprising a moulding cavity open at its ends and the lower part is a plate provided with grooves whose configuration matches that of the base of said individual moulds to allow these moulds to fit in said grooves.

According to a second embodiment of the moulding device according to the invention, the upper part is constituted by an assembly of moulds connected to one another, each comprising a moulding cavity open at its ends, and the lower part is a plate provided with grooves whose configuration matches that of the base of the assembly of moulds in order to allow this assembly to fit in said grooves.

In particular, the upper part is constituted by individual or connecting moulds, which are cylindrical and of circular cross-section, and the lower part is provided with annular grooves.

According to a third embodiment of the moulding device according to the invention, the lower part is constituted by a multi-mould plate comprising upwardly open half-cavities for moulding and grooves for interlocking surrounding the upper edges of said half-cavities, whilst the upper part is constituted by a counter-mould plate comprising upwardly and downwardly open half-cavities for moulding, complementary of the half-cavities of the multi-mould plate, and ribs for interlocking surrounding the lower edges of said half-cavities, the configuration of the grooves matching that of the ribs in order to allow the latter to fit in the former. In particular, the half-cavities are generally cylindrical, with aligned axes, whilst the interlocking ribs and the grooves are annular.

The half-cavities of the counter-mould plate are preferably each extended upwardly by a cylindrical/truncated bore forming a funnel for the admission of the liquid cheese into the moulding cavities.

Moreover, the truncated part of the funnel is pierced with vents.

The invention will be more readily understood on reading the following description with reference to the accompanying drawings, in which.

Figure 1:
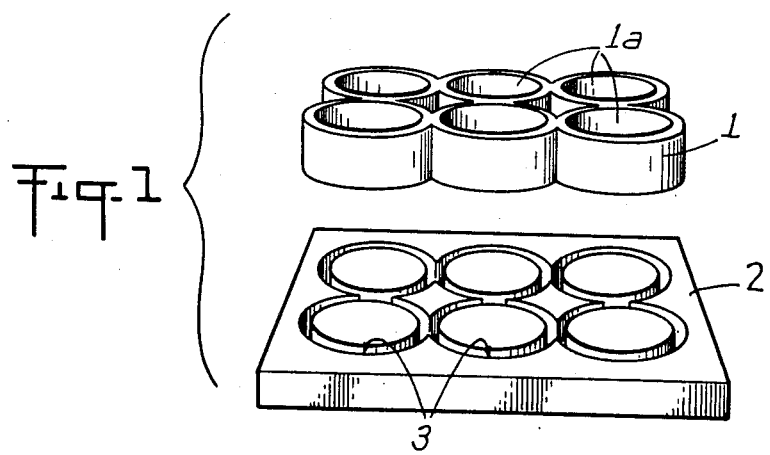
FIG. 1 is a view in perspective of the moulding device according to the invention showing the assembly of moulds and the plate before assembly.
Figure 2:
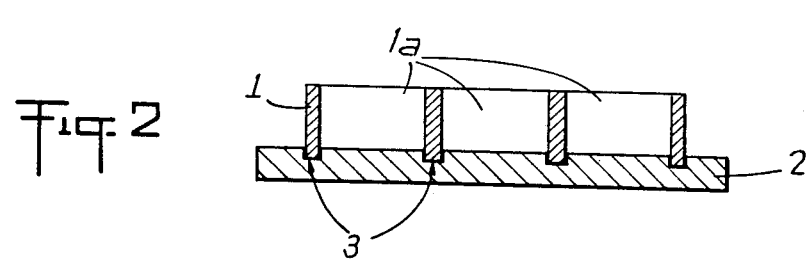
FIG. 2 is a view in sectional elevation of the device of FIG. 1 along a plane of symmetry of the aligned moulds.

Referring now to the drawings, and in particular to FIGS. 1 and 2, the moulding device according to the invention comprises:

on the one hand, an assembly 1 of generally cylindrical moulds (for example six moulds connected to one another along two or three generatrices) and comprising moulding cavities referenced 1a open at their ends, and on the other hand, a plate 2 provided with annular grooves 3 (for example 6 annular grooves tangential to one another in two's) matching the configuration of the lower part or base of the mould assembly; this mould assembly 1 is assembled, in removable and water-tight manner, with said plate 2 by interlocking of its lower part in the grooves 3 of this plate. Such an assembly system prevents any leakage of liquid pre-cheese outside the moulds during the moulding operation, and also enables the mould assembly to be separated from the plate by manual or mechanical action to facilitate recovery of the moulded cheeses or cleaning of the moulding device.

By way of non-limiting example, the moulding device according to the invention presents the following dimensions for 6 interconnected moulds:

| Mould assembly | |
|---|---|
| inner diameter of the moulds | 177 mm |
| thickness of the moulds | 5 mm |
| distance between axes of two contiguous moulds | 185 to 190 mm |
| material for moulds: polypropylene | |
| Plate | |
| inner diameter of the moulds | 177 mm |
| width of the grooves | 5 to 7 mm |
| depth of the grooves | 6 to 8 mm |
| distance between centres of two contiguous grooves | 185 to 190 mm |
| material for plate: high density polyethylene with low water absorption power. | |

The moulding device described hereinabove may advantageously be suitable for manufacturing cheeses weighing from 100 g to 2000 g and more, after adaptation to the grammage envisaged, of the dimensions mentioned hereinabove given by way of example.

Of course, instead of using the assembly of moulds connected to one another as described hereinabove, individual moulds may also be used with the plate described hereinabove. For example, six individual moulds may be used, having an inner diameter of 177 mm and a thickness of 5 mm.

Instead of the interlocking cylindrical moulds and annular grooves described hereinabove and intended for the manufacture of conventional cylindrical cheeses, moulds and grooves may also be used, having all the shapes envisaged for the manufacture of cheeses of square, rectangular, triangular, elliptic, diamond-shaped, heart-shaped, etc . . . section, without departing from the scope of the present invention.

Figure 5:
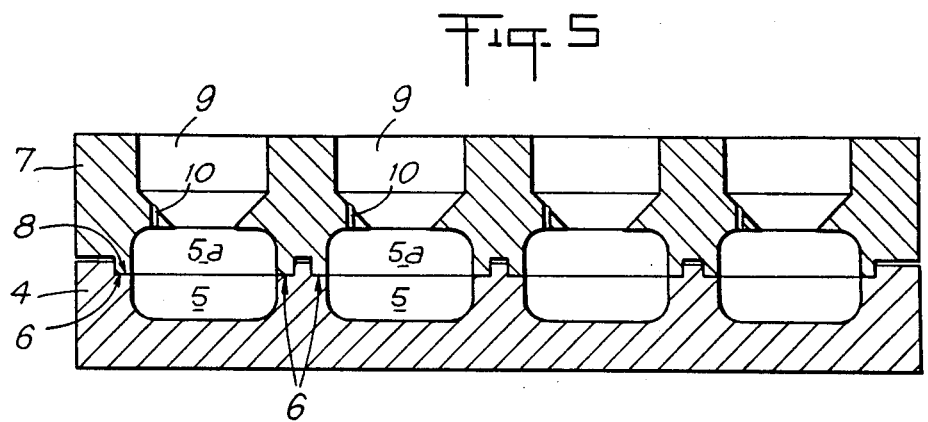
FIG. 5 is a view in sectional elevation of another embodiment of the moulding device according to the invention.
Figure 6:
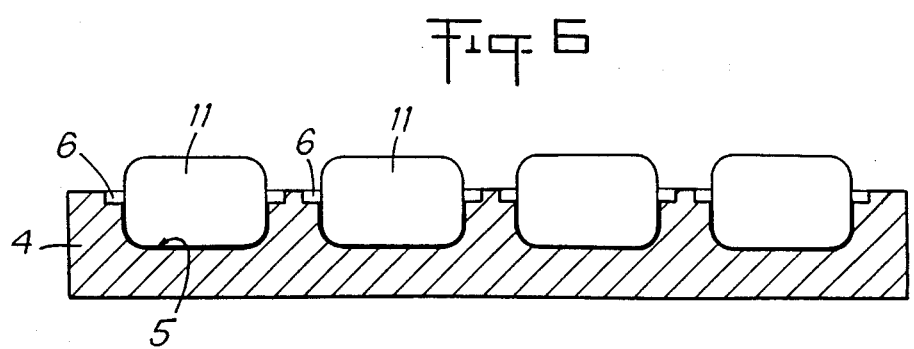
FIG. 6 is a view of the device of FIG. 5, in the course of demoulding.

According to another embodiment of the moulding device according to the invention, shown in FIGS. 5 and 6 of the drawings, this moulding device is constituted:

on the one hand, by a multi-mould plate 4 comprising half-cavities 5 for moulding (for example four cavities) which are generally cylindrical, open upwardly, with aligned axes, and annular grooves 6 for interlocking, coaxial to the moulding cavities and immediately adjacent the upper edges of said moulding cavities, on the other hand, by a center-mould plate 7 comprising:

downwardly open half-cavities 5a for moulding, complementary of the half-cavities 5 of the multi-mould plate 4, and annular ribs 8 for interlocking coaxial with said moulding cavities 5a and surrounding the edges thereof, these ribs having dimensions matching those of the grooves 6 in order to effect water-tight assembly of the counter-mould plate with the multi-mould plate by interlocking of said ribs in said grooves.

Furthermore, the moulding cavities 5a are extended upwardly by cylindrical/truncated funnels 9 for the admission of the liquid pre-cheese in the moulding cavities; vents 10 may be pierced in the truncated portions of the funnels for the evacuation of the air from the moulding cavities.

Such an assembly system prevents any leakage of liquid pre-cheese outside the moulding cavities during the moulding operation and also makes it possible to separate the counter-mould plate from the multi-mould plate by manual or mechanical action in order to facilitate recovery of the moulded cheese or cleaning of the moulding device.

Tightness of the assembly is ensured by the weight of the counter-mould plate, but other solutions may be envisaged: seals, clips, clamps, or other mechanical, pneumatic or hydraulic pressure system.

| | |
|---|---|
| diameter of the moulding cavities | 35 to 45 mm |
| height of the moulding cavities (total height) | 20 to 25 mm |
| distance between axes of two contiguous moulding cavities | 60 mm |
| diameter of the funnel | 40 mm |
| inner diameter of the ribs | 35 to 45 mm |
| outer diameter of the ribs | 55 mm |
| height of the ribs | 4.5 mm |
| outer diameter of the grooves | 55 mm |
| depth of the grooves | 4.5 mm |
| material for multi-mould and counter-mould: high density polyethylene with low water absorption power. | |

The moulding device described hereinabove advantageously enables cheeses weighing from 10 to 100 g to be manufactured, after adaptation to the grammage envisaged, of the dimensions mentioned hereinabove given by way of example.

The plate and the mould assembly as well as the multi-mould plate and the counter-mould plate may be made of any rigid material suitable for food products, with a reduced water absorption power, and preferably made of injectable thermoplastics materials suitable for food products.

In the following examples, the manufacture of a cheese of the semi-hard pressed type employing the moulding devices described hereinabove, is described.

EXAMPLE 1

Preparation of the Liquid Pre-cheese

In a vessel there is introduced a residue of ultrafiltration obtained by ultrafiltration of a milk of standardized fat content up to a concentration by volume of about 6 to 8 and more particularly 6.2 to 6.8; this residue has a total dry extract content of about 40 to 48% by weight (of which about 50% is protein matter) and more particularly:

41 to 43% of total dry extract content
20 to 22% of proteinaceous material
1 to 2% of residual lactose.

Mesophilic lactic ferments and rennet are added to this residue and all is mixed to obtain a homogeneous liquid pre-cheese.

Preparation of the Moulding Device

At the same time, the mould assembly 1 is assembled with the plate 2 (FIG. 2) to reconstitute the moulding device.

Moulding of the Cheeses

Figure 3:
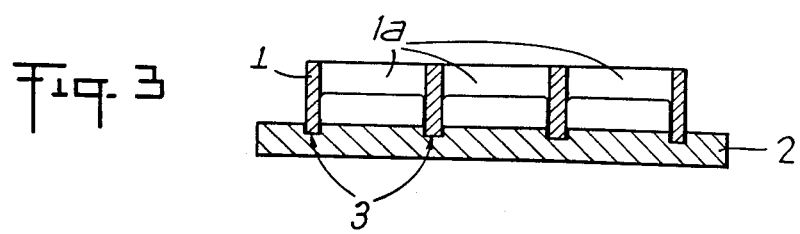
FIGS. 3 and 4 show views of the device in the course of moulding and in the course of demoulding, respectively.
Figure 4:
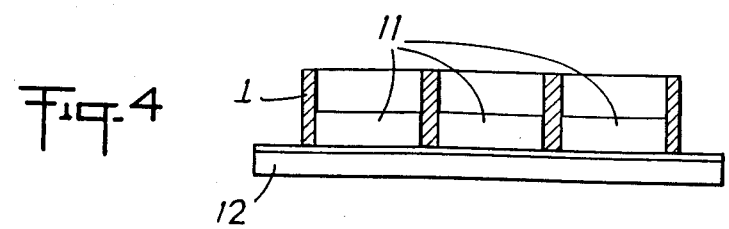

The liquid pre-cheese is introduced in dosed quantities, for example of 250 g, into the moulding cavities referenced 1a defined by the mould assembly 1 and the plate 2 (FIG. 3). After 15 to 30 minutes' rest, a firm coagulum 11 is obtained. 75 to 90 minutes afterwards, the so-called upturning operation is effected, during which the coagulum is separated from its plate 2 and placed on a conventional tray 12 whilst remaining inside the mould assembly 1; the plate 2 is dismantled from this mould assembly 1 and sent for washing (FIG. 4); the coagulum remains in its mould up to the final demoulding operation which takes place 18 to 20 hours afterwards.

The mould assembly 1 separated from the coagulum is sent for washing. The washed plate and mould assembly return to the manufacturing unit where they are assembled together again for further production.

The coagulum obtained is then subjected to conventional ripening operations which transform it into semi-hard pressed type cheese.

The cheeses obtained, according to the invention, correspond both from the standpoint of composition (total dry extract content: 51 to 53%; total fat/total dry extract ratio: 44 to 46%) and from the standpoint of outer appearance (absence of cracks and fractures), to the qualities which define conventional cheeses of the semi-hard pressed type.

EXAMPLE 2

Preparation of the Liquid Pre-Cheese

The liquid pre-cheese in this Example is prepared as described in Example 1.

Preparation of the Moulding Device

The multi-mould plate 4 is assembled with the counter-mould plate 7 by interlocking of the ribs 8 in the grooves 6 (FIG. 5) to reconstitute the moulding device.

Moulding of the Cheeses

The liquid pre-cheese is introduced in dosed quantities, for example of 20 g, through funnels 9, into the moulding cavities 5-5a.

A firm coagulum forms after 15 to 30 minutes of rest. 75 to 90 minutes afterwards, the counter-mould plate 7 is raised manually or by means of a mechanical device and separated from the multi-mould plate 4 (FIG. 6).

An upturning or extraction operation is then carried out with the aid of a mechanical device, to take the coagulum out of the multi-mould plate and to place it on a conventional tray where it will stand for 18 to 20 hours.

The coagulum obtained is then subjected to the conventional ripening operations which transform it into cheese of semi-hard pressed type.

The multi-mould plate and the counter-mould plate are sent to a washing unit where they are cleaned by conventional products used in cheese-making, from which they return to the manufacturing unit where they are assembled together again for further production.

The cheeses thus obtained correspond, both from the standpoint of composition (total dry extract contents: 51 to 53%; total fat/total dry extract ratio: 44 to 46%) and from the standpoint of outer appearance (absence of cracks and fractures), to the qualities which define the cheeses of semi-hard pressed type obtained by conventional processes.

What is claimed is:

1. A moulding device for the manufacture of semi-hard pressed cheeses from a moulded coagulum of a liquid pre-cheese, comprising:

a lower part constituted by a multi-mould plate having a plurality of half-cavities for moulding having open upper ends, and grooves surrounding the upper ends of said half-cavities thereof;

an upper part, superposable with said lower part, constituted by a counter-mould plate, having a plurality of half-cavities for moulding, said upper part half-cavities have open lower ends, said half-cavities of said counter-mould plate have ribs that are complementary with the grooves of the half-cavities of the multi-mould plate of the lower part, the configuration and dimensions of the grooves of the lower part matching that of the ribs of the upper part, so that said ribs fit into said grooves to form a removable and watertight interlocking joint, said plurality of half-cavities of said counter mold plate each have a top wall, the top wall of each of the half-cavities of the counter-mould plate being in communication with a respective one of a plurality of superjacent funnel-shaped bores for the admission of the liquid pre-cheese into the moulding cavities formed by the upper and lower superposable parts in the superposed condition, each said funnel shaped-bore having a cylindrical-truncated shape part, the cylindrical truncated shape part of each said funnel shaped-bore being pierced with at least one vent which extends from said cylindrical-truncated shape part to the top wall of a respective one of said half-cavities of the counter-mould plate.

2. A moulding device according to claim 1 wherein the counter-mould plate has a weight, and wherein the weight of the counter-mould plate is selected to ensure the tightness of the interlocking joint.

3. A moulding device for the manufacture of semi-hard pressed cheeses from a moulded coagulum of a liquid pre-cheese, comprising:
  a lower part constituted by a multi-mould plate having a plurality of half-cavities for moulding having open upper ends, and grooves surrounding the upper ends of said half-cavities thereof;
  an upper part, superposable with said lower part, constituted by a counter-mould plate, having a plurality of half-cavities for moulding, said upper part half-cavities have open lower ends, said half-cavities of said counter-mould plate have ribs that are complementary with the grooves of the half-cavities of the multi-mould plate of the lower part, the configuration and dimensions of the grooves of the lower part matching that of the ribs of the upper part, so that said ribs fit into said grooves to form a removable and watertight interlocking joint, said plurality of half-cavities of said counter mold plate each have a top wall, the top wall of each of the half-cavities of the counter-mould plate being in communication with a respective one of a plurality of superjacent funnel-shaped bores for the admission of the liquid pre-cheese into the moulding cavities formed by the upper and lower superposable parts in the superposed condition, each said funnel shaped-bore having a cylindrical-truncated shape part, the cylindrical truncated shape part of each said funnel shaped-bore being pierced with at least one vent which extends from said cylindrical-truncated shape part to the top wall of a respective one of said half-cavities of the counter-mould plate; and an upturning tray for receiving the moulded coagulum.

4. A moulding device according to claim 3, wherein the countermold plate has a weight and wherein the weight of the counter-mould plate is selected to ensure the tightness of the interlocking joint.

* * * * *

UNITED STATES PATENT AND TRADEMARK OFFICE
CERTIFICATE OF CORRECTION

PATENT NO. : 4,676,475

DATED : June 30, 1987

INVENTOR(S) : Claude Grandin; Philippe D. d'Aprigny

It is certified that error appears in the above-identified patent and that said Letters Patent is hereby corrected as shown below: Title Page:

<u>In the Inventors</u>: "Phillippe D. d'Aprigny" should read
--Philippe D. d'Aprigny--

Column 4, line 17, "center-mould" should read --counter-mould-- line 47, insert the following paragraph:
--By way of example, the moulding device according to the invention presents the following dimensions:--

Column 5, line 34, "minutes'" should read --minutes--
line 35, "obtained. 75" should read --obtained, and 75--

Column 6, line 6, "rest." should read --rest, and
line 25, "contents: 51" should read --content: 51--

Signed and Sealed this

Thirteenth Day of December, 1988

Attest:

DONALD J. QUIGG

*Attesting Officer*  *Commissioner of Patents and Trademarks*